MAGNETIC DOMAIN PROPAGATION DEVICE

Filed Aug. 31, 1965

INVENTORS A.V. HAAG
R.A. KAENEL
BY Herbert M. Shapiro
ATTORNEY

United States Patent Office 3,453,606
Patented July 1, 1969

3,453,606
MAGNETIC DOMAIN PROPAGATION DEVICE
Arthur V. Haag, Columbus, Ohio, and Reginald A. Kaenel, Chatham, N.J., assignors to Bell Telephone Laboratories, Incorporated, New York, N.Y., a corporation of New York
Filed Aug. 31, 1965, Ser. No. 484,076
Int. Cl. G11b *5/06;* G06k *7/08*
U.S. Cl. 340—174 8 Claims

ABSTRACT OF THE DISCLOSURE

A line scanner wherein a plurality of telephone lines is coupled electrically in parallel along a domain wall shift register in such a manner that an off-hook current appearing in one of those lines delays the movement of a domain wall propagated along the shift register in a portion thereof coupled by that line. The transit time for a domain wall to traverse the portion of the register coupled by the line is indicative of the presence and absence of an off-hook current in that line.

This invention relates to magnetic circuits and, more particularly, to magnetic domain wall shift register circuits.

A magnetic domain wall shift register comprises a material typically characterized by a re-entrant hysteresis characteristic. Such a material has the ability to maintain a reverse domain therein in response to a first (nucleating) field in excess of a characteristic nucleation threshold and, further, has the ability to move that reverse domain therein in response to a second (propagating) field in excess of a characteristic propagation threshold and less than said nucleation threshold.

As is well known, a reverse domain is bounded by a leading and a trailing domain wall which delineate a domain of reverse magnetization from domains of forward magnetization. Such reverse domains are propagated along the magnetic medium in response to a polyphase propagation field now well known. When a reverse domain is established and subjected to a uniform magnetic field, the domain walls are propagated towards one another or apart for first or second polarity fields, respectively. When the reverse domain is established near a boundary of the magnetic medium, one of the walls may be propagated off the medium while the other wall is propagated through the medium. Such shift registers, most conveniently, employ magnetic wire having the required characteristics. Particularly advantageous materials for such wires are disclosed in copending application Ser. No. 405,692, filed Oct. 22, 1964, for D. H. Smith and E. M. Tolman, now United States Patent 3,350,199. Such shift registers find use, for example, in line scanner circuits of the type described in copending application Ser. No. 464,066, filed June 15, 1965, for U. F. Gianola, R. A. Kaenel and H. E. D. Scovil. Specifically, that last-mentioned application discloses parallel input domain wall shift registers employed for detecting the presence of off-hook currents on auxiliary telephone lines in a telephone supervisory circuit. In general, and particularly for such line scanning operation, it is advantageous for shift registers to respond controllably to inputs of varying amplitude. For example, in line scanning operations, inputs in the form of telephone off-hook currents range within defined limits varying typically within one order of magnitude determined, primarily, by different distances between subscribers and a central office. In addition, current surges in telephone lines provide spurious large amplitude off-hook currents. A successful scanning circuit must not only function in response to varying off-hook currents but also must cope with the current surges.

A prime object of this invention is to provide a new and novel domain wall shift register arrangement.

Another object of this invention is a parallel-to-series domain wall shift register capable of responding to input signals of varying amplitudes.

The foregoing and further objects of this invention are realized in one embodiment thereof wherein a domain wall is propagated along a magnetic wire of a domain wall shift register. A plurality of individual input conductors are coupled to spaced apart positions of the wire and a sense conductor is coupled in opposing sense to the portions of the wire next preceding and next succeeding each input coupling. Bipolar pulses are induced in the sense conductor as the domain wall passes the sense couplings at each input. The presence of a current in an input conductor, however, delays the passage of the domain wall thus lengthening the time between bipolar pulses.

Consequently, a feature of this invention is a parallel input domain wall shift register wherein the presence or absence of currents in one of the inputs thereto is indicated by the retardation of a domain wall being propagated through corresponding positions in the register.

The foregoing and further objects and features of this invention will be understood more fully by a consideration of the following detailed description rendered in conjunction with the accompanying drawing wherein.

Figure 1:
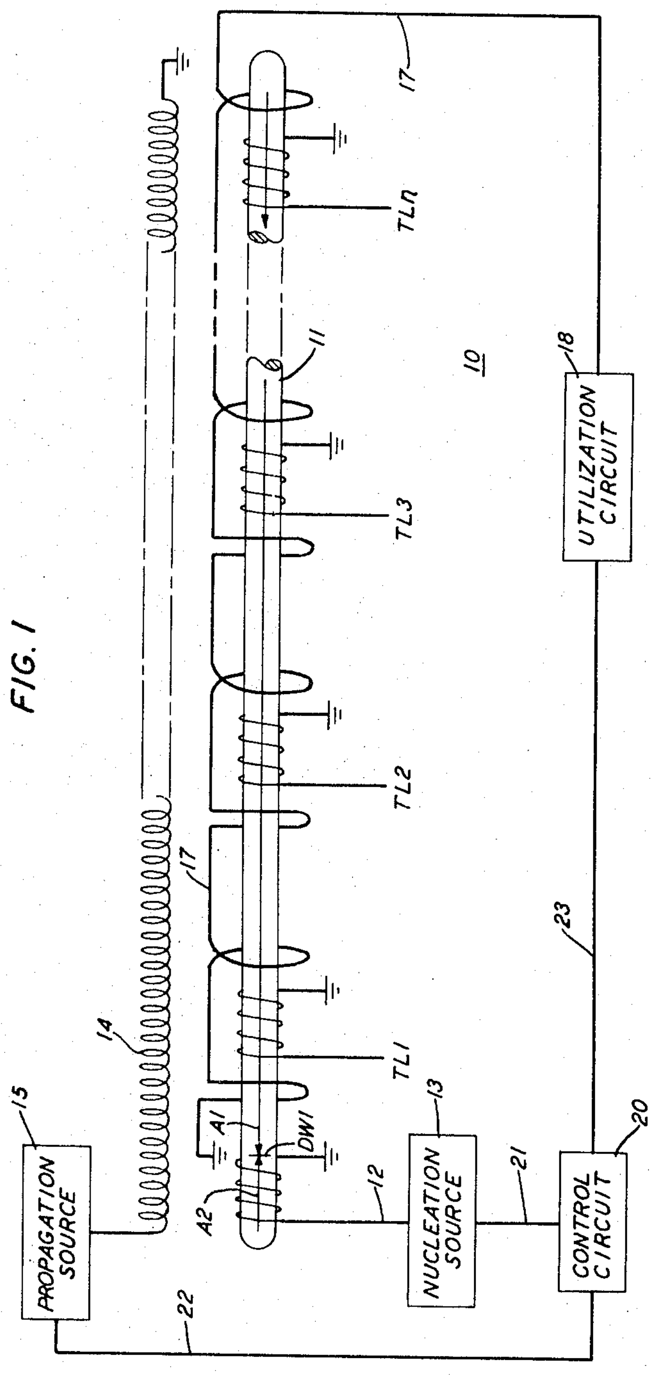
FIG. 1 is a schematic illustration of a domain wall shift register circuit in accordance with this invention.

Specifically, FIG. 1 depicts a domain wall shift register circuit 10 in accordance witth this invention. The shift register circuit includes a magnetic wire 11 to a first end of which a nucleation conductor 12 is coupled. Nucleation conductor 12 is connected between a nucleation source 13 and ground. A propagation conductor 14, coupling wire 11 along its entire length, is connected between a propagation source 15 and ground. Although propagation conductor 14 couples wire 11, it is shown spaced apart therefrom for the sake of clarity. A plurality of input conductors, designated TL1, TL2, TL3 . . . TL*n* are coupled to (illustratively wrapped about) wire 11 at spaced apart positions therealong. These input conductors may be telephone lines, the circuit functioning, for example, in the over-all context described in the aforementioned Gianola et al. application. A sense conductor 17 is coupled in opposing sense to the portions of wire 11 next preceding and next succeeding each portion thereof coupled by an input conductor. Sense conductor 17 is connected between a utilization circuit 18 and ground. Nucleation source 13, propagation source 15, and utilization circuit 18 are connected to a control circuit 20 by means of conductors 21, 22, and 23, respectively. The various sources and circuits may be any such elements operable in accordance with this invention.

The wire 11 is assumed normalized to a forward direction of magnetization represented by an arrow A1 directed to the left in FIG. 1. A reverse (magnetized) domain is represented by an arrow A2 directed to the right in FIG. 1, forming a domain wall DW1 with the domain of forward magnetization. For an illustrative operation, it is assumed that a current is flowing in line TL2. This might be interpreted as an off-hook current in a telephone line TL2 if the present invention is visualized in the context of a telephone supervisory circuit or as an input 010 . . . 0 (for inputs TL1, TL2, TL3 . . . TL*n*, respectively) if the operation is visualized as in the context of a parallel-to-series shift register.

In operation of the circuit of FIG. 1, a reverse domain is periodically nucleated at the extreme left of magnetic wire 11 as viewed in FIG. 1. The reverse domain is nucleated in response to a pulse applied to conductor 12 by means of nucleation source 13 under the control of control circuit 20. Propagation source 15 applies a continuous D.C. bias to propagation conductor 14, that bias being of a polarity to move domain wall DW1 to the right as viewed in FIG. 1. The domain wall advances to the right passing through the portions of wire 11 coupled by input TL1, TL2 . . . TL*n* in succession. As the domain wall passes each coupling of sense conductor 17, it induces therein a pulse of a polarity determined by the sense of the coupling. As the domain wall passes a pair of adjacent sense couplings to either side of an input, opposite polarity pulses are induced in the sense conductor due to the opposite senses of adjacent couplings. Typically, an input couples magnetic wire 11 over 100 mils and a domain wall traverses such a length in about one millisecond. Consequently, a pair of bipolar pulses are detected at about one millisecond intervals in the absence of a current in one of the input conductors. For the illustrative operation, input TL1 exhibits no current and the normal interval between bipolar output pulses is detected by utilization circuit 18 via sense conductor 17. A current flows in input TL2, however, and the subsequent passage of that domain wall through the corresponding portion of wire 11 requires about ten milliseconds. It is to be noted that the sense of the input coupling is such as to retard movement to the right of a domain wall, that is, in a sense to establish a forward domain in the coupled portion of wire 11 were a sufficiently large amplitude pulse to appear in that input conductor. It will be shown hereinafter that temporary large amplitude input pulses have negligible effect in accordance with this invention.

The domain wall continues its advance along wire 11 passing the portions thereof coupled by the remaining inputs without delay in accordance with the assumed illustrative operation. Thus there is provided a sequence of bipolar pulses in sense conductor 17 wherein the second pair of bipolar pulses, corresponding to input TL2, is spaced apart a second time longer than a first shorter time for the remaining pairs for detection by utilization circuit 18 under the control of control circuit 20. For the detection of bipolar pulses timed further apart, utilization circuit 18 may include a monopulser for providing an inhibiting pulse of a duration longer than the first time but shorter than the second time, permitting the second of the bipolar pulses to activate utilization circuit 18 only for the pulses timed further apart. After *n* pairs of bipolar pulses are observed, a reset pulse is applied under the control of control circuit 20, conveniently by reversing the polarity of the bias on conductor 14, for setting wire 11 to a forward direction. Nucleation source 13 again pulses conductor 12 for periodic repeat of the aforedescribed operation to research for (for processing) additional input signals.

Figure 2:
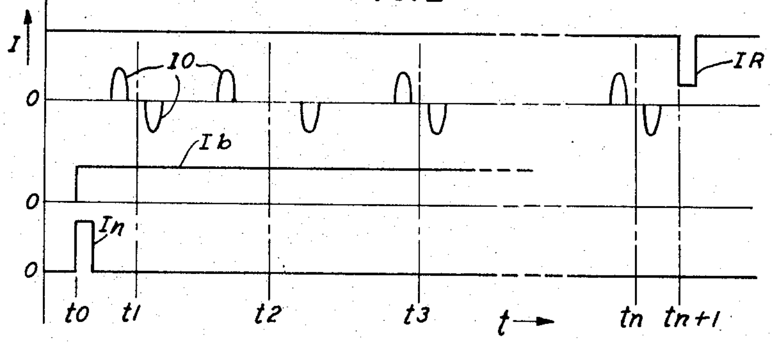
FIG. 2 is a diagram of the pulses appearing during the operation of the circuit of FIG. 1.

The pulse sequence during the operation of the circuit of FIG. 1 is summarized in connection with the pulse diagram of FIG. 2. Specifically, FIG. 2 is a plot of current versus time. The figure shows a nucleation pulse I*n* initiated at a time *t*0. Illustratively, a D.C. bias I*b* is shown initiated at the same time and persisting after the termination of the nucleation pulse. A sequence of bipolar pulse pairs, each pulse designated IO, is shown in the figure. The pulses are shown displaced, in time, about time designations *t*1, *t*2, *t*3, and *tn*, corresponding to the outputs for input conductors TL1, TL2, TL3 . . . TL*n*, respectively. The output pair about time *t*2 is shown timed further apart than the other outputs to indicate the delay of the passage of the domain wall by an input to conductor TL2 in the illustrative operation. After the termination of output pulses, at a time designated *tn*+1, a reset of pulse IR is applied to conductor 14 to drive wire 11 to a forward magnetization prior to a next nucleation pulse.

Operation has been described for a single input (binary one) to the circuit of FIG. 1. The description, however, is analogous for additional inputs (binary ones) which time corresponding bipolar pulses pairs further apart as the domain wall traverses the corresponding portion of wire 11.

Figure 3:
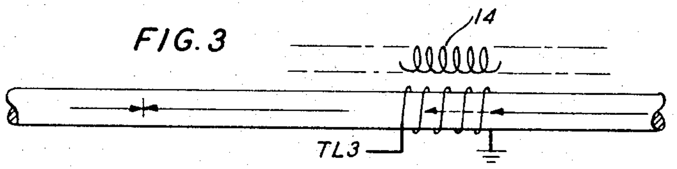
FIGS. 3 and 4 are schematic illustrations of a portion of the circuit of FIG. 1.
Figure 4:
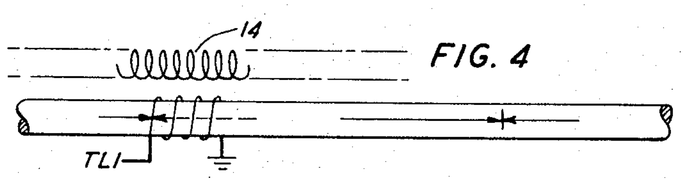

The description concerns itself with currents flowing in the input conductors prior to the passage of the domain wall through corresponding portions of wire 11. Currents flowing in the input conductors in a direction to delay domain walls tend to drive flux in wire 11 into the forward direction. That direction is illustrated by the broken arrow directed to the left in that portion of wire 11 coupled by conductor TL3 as shown in FIG. 3. As is clear from FIG. 3, prior to the passage of a domain wall, wire 11 is already saturated in the forward direction and such inputs (including temporary current surges) have only negligible effect other than to delay the domain wall as described. On the other hand, an input may appear after a domain wall has passed the corresponding portion of wire 11. In such instances, the affected portion of wire 11 is now magnetized in the reverse direction as indicated by the solid arrows directed to the right in FIG. 4. The input current is still of a polarity to drive magnetization in a forward direction as illustrated by the broken arrow directed to the left in FIG. 4. If the input current is insufficient to generate a stable forward domain, in the corresponding portion of wire 11, the result of such an input is negligible functioning only to delay passing domain walls as described. If, however, this input is sufficient to generate a forward domain, that domain tends to collapse in response to the propagation field. If such an input surge remains on the line when a next succeeding domain wall is propagated along wire 11, scanning service is delayed until the surge terminates. Since such surges are due, for example, to lightening, they are terminated quickly causing no significant delay in service. Thus, the presence of an input of any amplitude results, in accordance with this invention, only in the delay of a domain wall.

It may be appreciated that each input coupling shown in FIG. 1 is a different distance from the initial position of domain wall DW1, in effect, providing a plurality of shift registers of different length for different input conductors. Actually, the circuit of FIG. 1 may be implemented by a plurality of magnetic wires of different lengths in which domain walls are launched simultaneously and in which, further, individual indications are provided sequentially, depending on the length of the magnetic wire of each, exactly as described hereinbefore.

Figure 5:
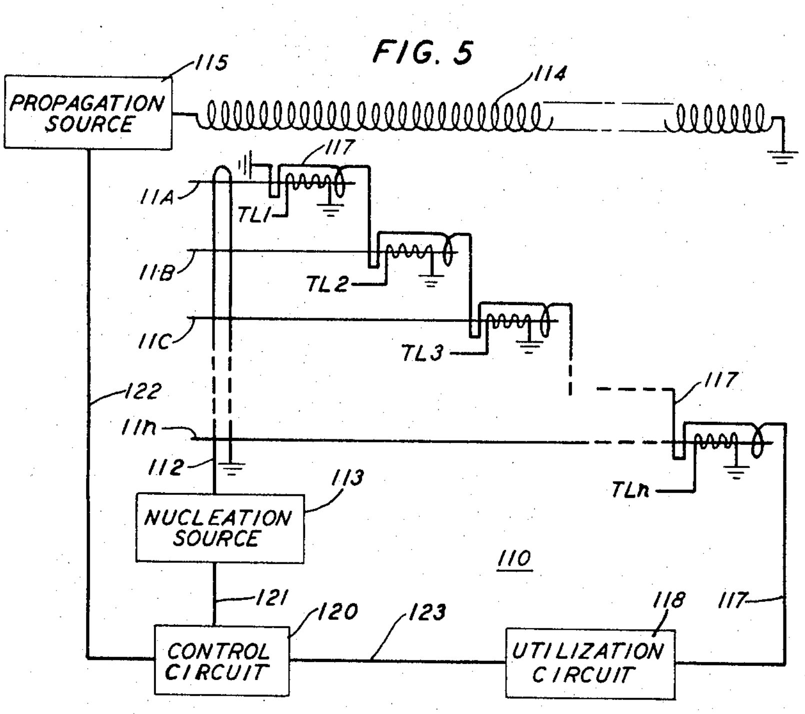
FIG. 5 is a schematic illustration of another domain wall shift register in accordance with this invention.

Such an arrangement is shown in FIG. 5. Specifically, FIG. 5 shows a shift register 110 including a plurality of magnetic wires represented by horizontal lines designated **11A, 11B, 11C . . . 11*n*. A nucleation conductor 112 coupling all of said wires at the extreme left thereof, as viewed in FIG. 5, is connected between a nucleation source 113 and ground. A propagation conductor 114, shown spaced apart from the magnetic wires for the sake of clarity, is coupled to all of the magnetic wires along their entire lengths. The propagation conductor is connected between propagation circuit 115** and ground. Each of a plurality of input conductors, designated TL1, TL2, TL3 . . . TL*n* to correspond to the input conductors of FIG. 1, is connected to the correspondingly numbered magnetic wire at positions thereof successively further to the right as viewed in FIG. 5 to correspond to the positioning of said input conductors along the single magnetic wire of FIG. 1. A sense conductor 117 couples each of the magnetic wires by a pair of couplings of opposing sense to either side of the input coupling. Conductor 117 thus couples the magnetic wires 11A . . . **11*n* in succession being connected between a utilization circuit 118 and ground. The nucleation source 113, the propagation source 115, and the utilization circuit 118 are connected to a control circuit 120 by means of conductors 121, 122, and 123**, respectively. The various circuits and sources may be any such elements operable in accordance with this invention.

The operation of the circuit of FIG. 5 is entirely analogous to the operation of the circuit of FIG. 1 except that in the former a plurality of domain walls, one in each magnetic wire, is launched simultaneously. In such an arrangement, temporary current surges in a line associated with a particular magnetic wire may not effect a delay in a domain wall in another magnetic wire. No untoward effects need occur however. As a domain wall, in accordance with this invention, passes a line coupling a magnetic wire, it provides bipolar pulses in the sense conductor. If a delay occurs, and that delay is of a type to delay one domain wall for a time to permit the recording of the line condition for the line coupled, for example, to the next longer magnetic wire as shown in FIG. 5, two pulses of like polarity appear in the sense conductor. The like polarity pulses occur because a domain wall can be delayed only after it passes the portion of the magnetic wire to which the coupling of the sense conductor, next preceding that portion thereof coupled by an input line, is coupled. Therefore, that wall provides a pulse of a first polarity and, if then delayed sufficiently long, the wall in the next adjacent magnetic wire provides a next pulse of that same polarity. Utilization circuit 118 may include straightforward logic circuitry responsive to two like polarity pulses in sequence for reconciling bipolar outputs to corresponding lines. Alternatively, the delayed wall may be followed by a second domain wall which destroys the first domain wall if the latter is delayed longer than a designated period.

The invention has been described in terms of a single coil or coupling of a sense conductor coupled to a magnetic wire in the positions therealong next preceding and next succeeding the position coupled by an input conductor. It may be convenient, however, to couple a sense conductor to a plurality of spaced apart positions next preceding each input coupling. For example, the line TL1 of FIG. 1 may include one sense coupling next preceding the input coupling; TL2 may be preceded by two spaced apart couplings; TL3 may be preceded by three, and so forth. In this manner a sequence of like polarity pulses appears in the sense conductor next preceding each pulse of opposite polarity where the number of like polarity pulses is characteristic for the corresponding input conductor.

What has been described is considered to be only illustrative of the principles of this invention. Accordingly, various and other embodiments may be devised by one skilled in the art without departing from the spirit and scope of this invention.

What is claimed is:

1. A domain wall shift register, means for providing a domain wall in a first portion of said shift register, means for moving said domain wall in said shift register, and means for selectively delaying said domain wall at spaced apart positions in said shift register in response to coded inputs, said last-mentioned means comprising a plurality of input means for selectively generating retarding fields in portions of said shift register coupled thereby in response to pulses therein, and a sense conductor coupled to the portions of said shift register next preceding and next suceeding each of said input means.

2. A domain wall shift register in accordance with claim 1 wherein said shift register comprises a single magnetic wire and said inputs comprise conductors coupled to said wire at spaced apart positions therealong.

3. A domain wall shift register, means for providing a domain wall in a first portion of said shift register, means for moving said domain wall in said shift register, means for selectively delaying said domain wall at spaced apart positions in said shift register in response to coded inputs, said last-mentioned means comprising a plurality of input conductors for selectively generating retarding fields in portions of said shift register coupled thereby in response to pulses therein, and means including a sense conductor coupled in opposing sense to the portions of said shift register next preceding and next succeeding each of said conductors.

4. A domain wall shift register in accordance with claim 3 including means coupled to said sense conductor for detecting the delay of said domain wall at each of said positions.

5. A domain wall shift register in accordance with claim 1 wherein said shift register comprises a plurality of magnetic wires of different lengths and said means for providing a domain wall comprises means for providing a domain wall in a corresponding first position of each wire.

6. A domain wall shift register in accordance with claim 5 wherein said inputs comprise conductors each coupled to a different wire at a different distance from said first portion thereof.

7. A domain wall shift register in accordance with claim 6 including a sense conductor coupled in opposing sense to the positions of said wires next preceding and next succeeding each of said conductors.

8. A domain wall shift register in accordance with claim 7 including means coupled to said sense conductor for detecting the delay of said domain wall at each of said positions.

References Cited

UNITED STATES PATENTS

| | | | |
|---|---|---|---|
| 3,261,002 | 7/1966 | Edmunds | 340—74 |
| 2,790,160 | 4/1957 | Millership | 340—174 |

JAMES W. MOFFITT, *Primary Examiner.*